July 28, 1959      L. E. DEAN      2,897,008

PEBBLE FLOW RATE CONTROLLER

Filed Dec. 21, 1953

INVENTOR.
L.E. DEAN

BY *Hudson and Young*

ATTORNEYS

United States Patent Office 2,897,008
Patented July 28, 1959

2,897,008

PEBBLE FLOW RATE CONTROLLER

Lloyd E. Dean, Bartlesville, Okla., assignor to Phillips Petroleum Company, a corporation of Delaware Application December 21, 1953, Serial No. 399,477

5 Claims. (Cl. 302—53)

This invention relates to pebble heat exchangers. In one of its more specific aspects, it relates to pebble heat exchanger apparatus. In another of its more specific aspects, it relates to improved means for controlling the elevation of pebbles in a gas-lift type elevator. In another of its more specific aspects, it relates to a method for controlling the rate of flow of pebbles through a gas-lift type elevator.

Heat exchangers of the so-called "pebble heater" type have been utilized in recent years for the purpose of heating fluids to elevated temperatures. Such apparatus is especially suited for use in temperature ranges above those at which the best available high temperature structural alloys fail. Thus, such equipment may be used for superheating steam or other gases and for the pyrolysis of hydrocarbons to produce various products, such as ethylene and acetylene, as well as for other reactions and purposes. Conventional pebble heater type apparatus includes two refractory lined contacting chambers disposed one above the other and connected by a refractory lined passageway or pebble throat of relatively narrow cross section.

Refractory solids of flowable size and form, called "pebbles," are passed continuously and contiguously through the system, flowing by gravity through the uppermost chamber, the throat, and the lowermost chamber, and are then conveyed to the top of the uppermost chamber to complete the cycle.

Solid heat exchange material which is conventionally used in pebble heater apparatus is generally called "pebbles." The term "pebbles," as used herein, denotes any solid refractory material of flowable size and form, having strength, which is suitable to carry large amounts of heat from the pebble heating chamber to the gas heating chamber without rapid deterioration or substantial breaking. Pebbles conventionally used in pebble heater apparatus are ordinarily substantially spherical in shape and range from about ⅛ inch to about 1 inch in diameter. In a high temperature process, pebbles having a diameter of between ¼ inch to ⅜ inch are preferred. The pebbles must be formed of a refractory material which will stand temperatures at least as high as the highest temperature attained in the pebble heating chamber. The pebbles must also be capable of withstanding temperature changes within the apparatus. Refractory materials, such as metal alloys, ceramics, or other satisfactory material, may be utilized to form such pebbles. Silicon carbide, alumina, periclase, beryllia, Stellite, zirconia and mullite may be satisfactorily used to form such pebbles or may be used in admixture with each other or with other materials. Pebbles formed of such materials, when properly fired, serve very well in high temperatures, some withstanding temperatures up to about 4000° F. Pebbles which are used may be either inert or catalytic as used in any selected process.

The pebbles are heated in one of the chambers (preferably the upper one) by direct contact therein with hot gases, usually combustion products, to the desired temperature, generally in the range of 1400° F. to 3500° F. The hot pebbles are thereafter contacted with the fluid to be superheated or reacted, as the case may be, in the other chamber. Generally, pebble inlet temperatures in the lower chamber are about 50° F. to 200° F. below the highest temperature of the pebbles within the upper chamber. In processes for the production of ethylene from light hydrocarbons, such as ethane, propane, or butane, the pebble temperature in the reaction chamber is usually in the range of 1200° F. to 1800° F. For the production of acetylene by pyrolysis of hydrocarbons, temperatures in the range of 1600° F. to 3000° F. are desirable.

In the past, considerable trouble has been encountered in elevating pebbles through a gas-lift type elevator. Small tubes have been successfully used for elevating pebbles, but when the volume of pebbles to be removed has been such that the diameter of the tube has been enlarged to as much as 10 inches and greater, it has been necessary to use so much lift gas to accelerate the pebbles entering the gas-lift tube that the velocity of the pebbles becomes so great that they are slammed against the top of the disengaging chamber, causing considerable abrasion of the chamber and also resulting in the fracturing of considerable amounts of the pebbles. Attempts have been made to use gas-lift tubes which gradually increase in size as the top of the tube is approached but such devices have not solved the problem.

Each of the following objects of this invention is attained by at least one aspect of the invention.

An object of this invention is to provide an improved gas-lift for pebbles. Another object of this invention is to provide means for controlling the rate of pebble flow through a gas-lift. Another object of this invention is to provide an improved method for controlling the flow of pebbles through a gas-lift for pebble heater apparatus. Other and further objects of this invention will be apparent to those skilled in the art upon study of the accompanying discussion and the drawings.

Broadly speaking, this invention comprises a means and method for controlling the rate of flow of solid particles, such as pebbles, through a gas-lift. Pebbles are introduced into an elevator conduit through which a heated gas is passed at such a rate as to entrain the pebbles therein and to lift those pebbles to the upper end portion of that conduit. The pebbles are blown from the upper end portion of the elevator conduit into a separator chamber of sufficiently greater cross section than the elevator conduit to permit the pebbles to settle out of the gas stream, the gas being removed from the upper portion of that chamber and the pebbles being permitted to gravitate from the lower end portion of the separator chamber. I have conceived of the method of controlling the rate of pebble flow through such a gas-lift by causing a reduction in the ratio of lift gas volume to cross-sectional area of the lift-gas or elevator conduit in a controlled manner so as to prevent the pebbles from being blown from the elevator conduit against the top of the separation chamber. This ratio of lift-gas volume to cross-sectional area is primarily controlled by a controlled indirect heat exchange between the lift-gas in the upper portion of the elevator conduit and a heat exchange fluid maintained around the upper portion of the elevator conduit. As one means of controlling the heat exchange between the lift-gas and the cooling fluid, a casing is provided, surrounding at least an upper portion of the elevator conduit, and spaced therefrom. The bottom portion of the casing is opened to the flow of atmospheric air and ports are provided in the upper portion of that casing which is otherwise closed at its upper end. Closure means are provided so as to regulate the portions of the ports which are maintained open to the flow of air.

Better understanding of this invention will be obtained upon study of the accompanying schematic drawings in which.

Figures 1, 2, 3:
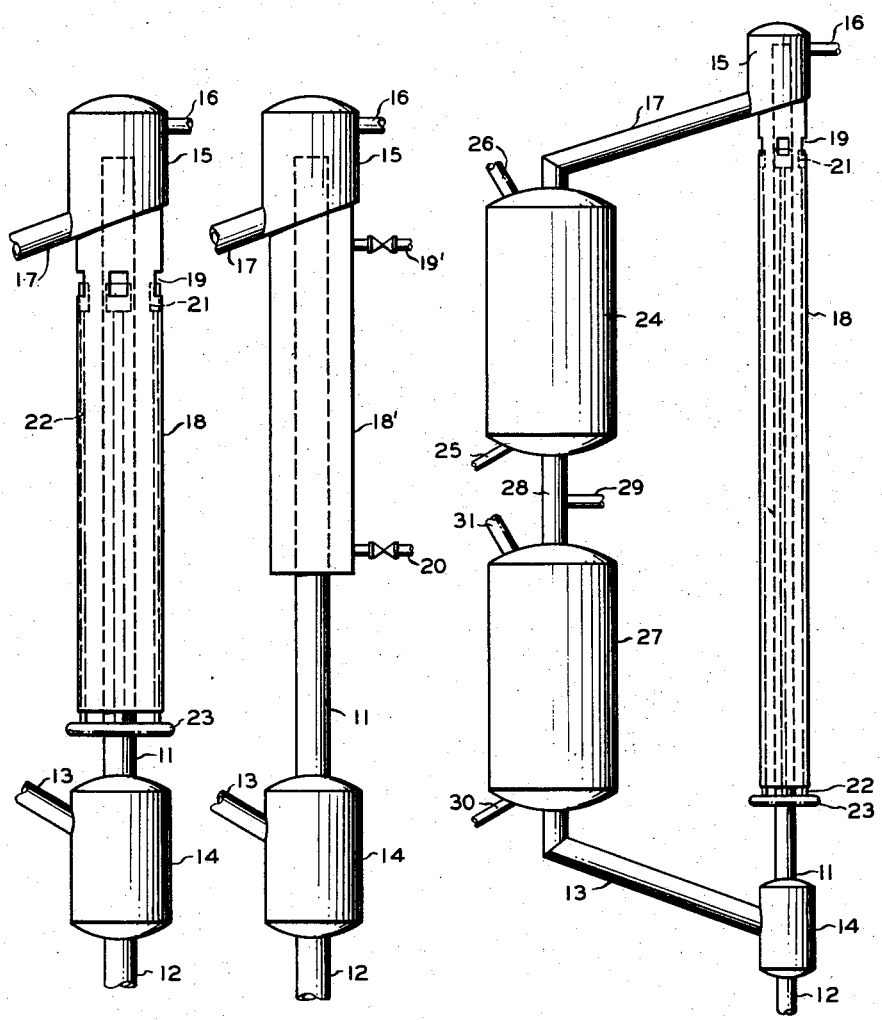
Figure 1 is a diagrammatic representation of the gas-lift device of this invention.
Figure 2 is a preferred modification of this invention.
Figure 3 is a schematic view of pebble heater apparatus utilizing the flow rate control of this invention.

Referring particularly to Figure 1 of the drawings, upright, elongated conduit 11 comprises a gas-lift elevator into which hot lift-gas is introduced through conduit 12 at a temperature which approximates the temperature of pebbles introduced by conduit 13 into engaging pot 14 and from which engaging pot the pebbles are passed into conduit 11. Any means of passing the pebbles into the gas stream so as to transport them in the gas stream to the upper end of conduit 11 may be used.

As pointed out above, when the velocity of the gas is sufficiently great to result in the entrainment of the pebbles, the pebbles are blown through conduit 11 at such a velocity that upon emerging from the upper end of conduit 11, they are blown against the top of a separation chamber such as chamber 15. Such a separation chamber is provided with a gaseous material outlet 16 in its upper end portion and a pebble conduit 17 in its lower end portion.

I have devised a means whereby the movement of pebbles through the upper portion of lift conduit 11 at such a velocity that they are blown against the top of the separation chamber is prevented. In one modification of this invention, I provide a sleeve 18 which fits over a portion of conduit 11 for a substantial distance below chamber 15, preferably from a point approaching the level at which said pebbles are entrained. Sleeve 18 is spaced from conduit 11 and is open at its lower end while being closed at its upper end, one such means of closure being to affix the upper end of sleeve 18 by a gas-tight seal to the lower end of separation chamber 15. Ports 19 are provided in the upper end portion of sleeve 18 so as to permit the flow of air therethrough. Closure members 21 are provided so as to selectively close portions of ports 19 and thereby regulate the amount of opening through which air is permitted to flow. Control rods 22 are connected to closure members 21 and to an actuator member 23 so that closure members 21 can be moved into a selected position to control the area of the opening through which air is permitted to flow. Although closure members 21 are shown as being moveable longitudinally with respect to conduit 11, they can also be positioned so that control can be obtained by rotation of those members to partially close ports 19.

Referring particularly to Figure 2 of the drawings, parts like those described in connection with Figure 1 are designated by like numerals. This device is modified by providing a jacket 18' around at least the upper portion of conduit 11 and providing liquid coolant inlet means 19' and liquid coolant outlet means 20 at the upper and lower portions of the jacket, respectively.

Referring particularly to Figure 3 of the drawings, pebbles are introduced into the upper end portion of heater chamber 24 through conduit 17 and gravitate therethrough as a contiguous pebble mass. Gaseous heating material is introduced into the lower end portion of chamber 24 through inlet conduit means 25 and is distributed therein so as to heat the pebbles to the desired temperature, generally within the range of 1400° F. to 3500° F. Gaseous effluent material is removed from the upper end portion of chamber 24 through gaseous effluent outlet conduit 26 and pebbles which have been heated to the desired temperature are gravitated into the upper end portion of a second chamber 27 through pebble conduit means 28. Although only one pebble conduit 28 is shown, it is to be understood that a plurality of such conduits may be utilized if so desired. A sealing gas, such as steam, is introduced into conduit 28 through conduit 29 so as to prevent the flow of gaseous material from one chamber to another. Gaseous material to be heated or converted within chamber 27 is introduced into the lower end portion of chamber 27 through conduit 30. That gaseous material passes upwardly through the gravitating mass of pebbles within chamber 27 and is raised to the desired temperature for the heating or conversion which is being carried on in that chamber. Gaseous effluent is removed from the upper end portion of chamber 27 through gaseous effluent outlet conduit 31. Pebbles which have been somewhat cooled during the heating or conversion within chamber 27 are removed from the lower end portion of that chamber at a temperature which is generally within the range of 900 to 2000° F., depending upon the reaction or amount of heat exchange which takes place within that chamber.

The hot pebbles are gravitated through conduit 13 into engaging chamber 14 wherein a relatively static mass of pebbles is formed. Openings are provided in conduit 11 so as to permit the passage of pebbles into that conduit. Lift-gas which is utilized as the motivating force for carrying the pebbles from engaging chamber 14 into separation chamber 15 is heated, by heating means not shown, to a temperature approximating the temperature of the pebbles introduced into conduit 11. Such heating of the lift-gas is economically desirable since it prevents the continual cooling and reheating of pebbles used in such a pebble heater device, which cooling and reheating over wide limits of temperature results in considerable weakening of the pebbles. It further prevents thermal shock of the pebbles which would result if a cold lift-gas were used to entrain the pebbles.

I have found that excellent control can be obtained over the flow of pebbles through conduit 11 by controlling the cooling of the lift-gas by means of a control of the flow of cooling medium around conduit 11. Closure members 21 are positioned so as to permit the flow of air upwardly through the annulus formed by the sleeve 18 and conduit 11 as a convection current. In this manner, I have found that the ratio of lift-gas volume to cross-section area of the lift conduit is reduced in a controlled manner so that pebbles which emerge from the upper end of conduit 11 are permitted to settle out without being subjected to the severe mechanical shock of being brought into contact with the top chamber 15 at the high velocity normally used to convey the pebbles through that conduit.

Although I have particularly described my invention with respect to the means whereby cooling of the lift-gas is obtained through the controlled flow of ambient atmospheres, it is to be understood that other types of cooling may be utilized in a device, such as is shown in Figure 2, to reduce the ratio of lift-gas volume to cross-section area of the lift conduit in a controlled manner. As one modification, I may circulate a cooled fluid, such as water, through that chamber so as to cool the lift-gas prior to its emergence from the upper end of conduit 11.

Various modifications of this invention will be apparent to those skilled in the art upon study of the accompanying disclosure and the drawings. Such modifications are believed to clearly fall within the spirit and the scope of this invention.

I claim:

1. A process for elevating solid particulate heat-exchange material comprising substantially spherical pebbles of a diameter in the range of about 1/8" to 1" from a zone of elevated temperature to a zone of substantially higher temperature which comprises suspending said material in a stream of ascending hot gas in a lift tube introduced thereto at a temperature substantially that of said pebbles so as to transport the material to a separation vessel surrounding the upper end of said tube; and substantially cooling said gas at least in a substantial uppermost section of said tube so as to reduce the transport effect of the gas and the velocity of said particulate material as it passes through the upper section of said lift tube, thereby decreasing the tendency of said material to impinge on the roof of said vessel and avoiding thermal shock to said pebbles.

2. The process of claim 1 wherein said cooling is effected by indirect heat exchange with a cooling fluid on the outside of said tube.

3. The process of claim 2 wherein said fluid comprises air.

4. A process for elevating hot solid heat-exchange material in the form of pebbles of a diameter in the range 1/8" to 1" which comprises introducing said pebbles into a stream of ascending lift gas in a lift tube at a temperature substantially that of said pebbles thereby avoiding thermal shock of said pebbles so as to lift said pebbles to an expanded separation zone of reduced gas velocity surrounding the upper end of said lift tube; and substantially cooling said gas at least in a substantial upper section of said tube adjacent said separation zone so as to reduce the transport velocity of said pebbles as they pass thru the upper end of said lift tube.

5. The process of claim 4 wherein said pebbles are at a temperature in the range of 900 to 2000° F.

References Cited in the file of this patent
UNITED STATES PATENTS

| | | |
|---|---|---|
| 1,825,707 | Wagner | Oct. 6, 1931 |
| 2,088,280 | Schillinger | July 27, 1937 |
| 2,429,359 | Kassel | Oct. 21, 1947 |
| 2,607,635 | Kollgaard | Aug. 19, 1952 |
| 2,635,706 | Gilmore | Apr. 21, 1953 |
| 2,646,316 | Kollgaard | July 21, 1953 |
| 2,678,812 | Richardson | May 18, 1954 |
| 2,715,018 | Lapple et al. | Aug. 9, 1955 |